United States Patent [19]

Cheng

[11] Patent Number: 5,657,155
[45] Date of Patent: Aug. 12, 1997

[54] OPTICAL TAP COUPLER DEVICE

[75] Inventor: Yihao Cheng, Kanata, Canada

[73] Assignee: JDS Fitel Inc., Ottawa, Canada

[21] Appl. No.: 698,648

[22] Filed: Aug. 16, 1996

[51] Int. Cl.$^6$ .............................. H01S 3/00; G02B 27/10
[52] U.S. Cl. .......................... 359/341; 359/618; 359/622; 385/33
[58] Field of Search ...................... 359/618, 622, 359/634, 639, 341; 385/33, 47

[56] References Cited

U.S. PATENT DOCUMENTS

| | | | |
|---|---|---|---|
| 4,550,975 | 11/1985 | Levinson et al. | 350/96.18 |
| 4,834,485 | 5/1989 | Lee | 350/96.19 |
| 5,082,343 | 1/1992 | Coult et al. | 385/34 |
| 5,299,056 | 3/1994 | Kurata et al. | 359/341 |
| 5,452,124 | 9/1995 | Baker | 359/341 |
| 5,539,577 | 7/1996 | Si et al. | 359/628 |

*Primary Examiner*—Mark Hellner
*Attorney, Agent, or Firm*—Neil Teitelbaum & Associates

[57] ABSTRACT

An optical tap/coupler consists essentially of a two graded index lenses having a holographic beam splitter (HBS) in between. The HBS independent of polarization state and wavelength of an input light beam splits an incoming beam into at least two beams. The two beams are directed to two separate locations or ports at an end face of one of the graded index lenses thereby providing a main beam and a tap beam at an output of the device. The device is compact and can accommodate other optical components between the two graded index lenses.

7 Claims, 6 Drawing Sheets

Fig. 1
Prior Art
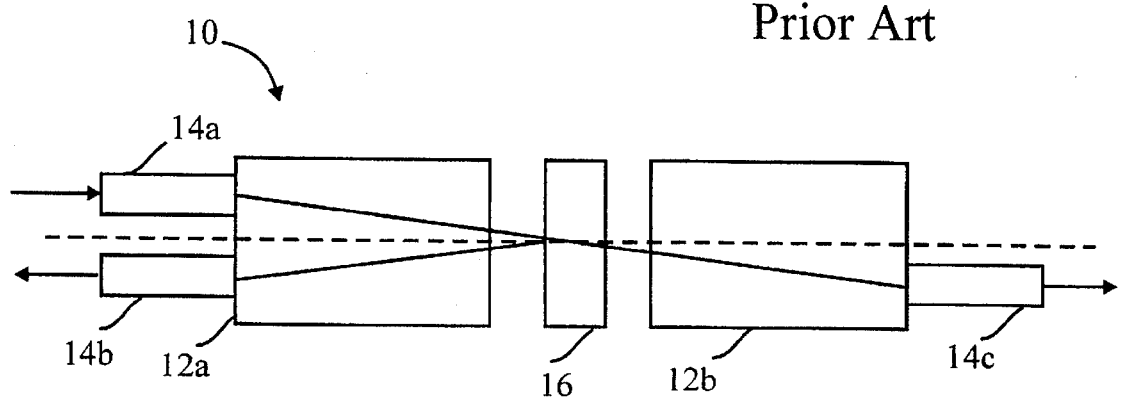
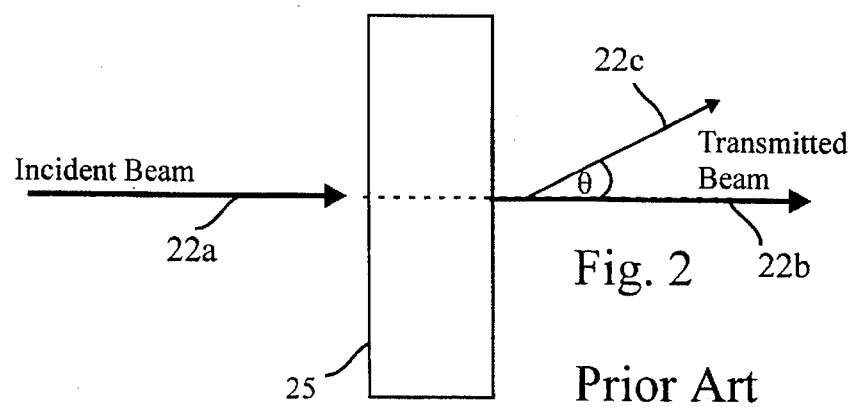
Fig. 2
Prior Art

OPTICAL TAP COUPLER DEVICE

FIELD OF THE INVENTION

This invention relates to optical tap couplers and more particularly to systems that require a tapping port at or near an output end of a device.

BACKGROUND OF THE INVENTION

A variety of means are known and used for tapping a portion of light from a beam of light. Tapping light from a beam is often performed for monitoring purposes; for example a tap signal may be monitored to acquire information with regard to its presence, its amplitude, its wavelength, or some other characteristic of the beam of light. One of the more common taps is in the form of a splitter filter which passes a substantial portion of an incident beam of light to an output port on an output side of the device, and reflects a smaller predetermined portion of the beam to a port on the input side. Although this type of tap adequately performs its intended function, in certain instances there are circuit configurations wherein such taps are less than adequate due to their location within the circuit. For example, most conventional taps are generally well suited to receiving a reflected tap beam adjacent an input port where light is launched; thus in such an instance the tap signal provides information related to the input beam or signal. However, if the beam of light launched into several optical components is modified by those components in some manner, as is often the case, a tap at the input of the optical circuit would not contain information related to the condition or state of the light at or near the output of the circuit.

It is therefore an object of this invention, to provide a circuit having a tap at or near the output.

It is a further object of this invention, to provide a arrangement of optical components that provides forward tapping at the output end of a device.

It is a further object of the invention to provide a coupler for coupling light from at least two output ports on a same end face of a lens, to a single port at another lens.

SUMMARY OF THE INVENTION

In accordance with the invention a device for routing light into at least two directions is provided, comprising:

a first substantially collimating lens having at least a single port for inputting the light;

means for splitting the light independent of its polarization state and substantially independent of its wavelength into at least two diverging beams propagating in a forward direction; and, a second substantially focusing lens having at least two ports for receiving at least some of the light, one of the at least two ports for receiving light from one of the at least two diverging beams, and the other of the at least two ports for receiving light from the other of the at least two diverging beams.

In accordance with the invention there is further provided, an optical device having a tap port for tapping a portion of input light, comprising:

a first substantially collimating graded index lens having at least an input port for inputting the light;

means for splitting the light independent of its polarization state and substantially independent of its wavelength into at least a first and second beam of light, the two substantially non-parallel beams propagating in a same forward direction;

a second substantially focusing graded index lens having at least two ports at a focusing end to receive the at least first and second beams of light, the means for splitting the light being disposed between the first and second graded index lenses.

In accordance with the invention an optical device for routing light is provided, comprising:

a first substantially collimating/focusing graded index lens having at least port for passing the light;

means for splitting the light independent of its polarization state and substantially independent of its wavelength into at least a first and second beam of light, the two substantially non-parallel beams propagating in a same forward direction, or combining the light independent of its polarization state from at least a first and second beam of light into a single beam of light;

a second substantially collimating/focusing graded index lens having at least two ports to receive the at least first and second beams of light, the means for splitting or combining the light being disposed between the first and second graded index lenses.

In accordance with another aspect of the invention optical amplifier is provided comprising:

a rare earth doped waveguide for providing an amplified signal;

means for pumping the rare earth doped waveguide coupled to the waveguide;

an input lens optically coupled to the rare earth doped waveguide for receiving at least most of the amplified signal;

an output lens optically coupled to the first lens; and, a means disposed between the first and output lenses for splitting the light independent of its polarization state and wavelength into at least a first and second beam of light, the two substantially non-parallel beams propagating in a same forward direction.

BRIEF DESCRIPTION OF THE DRAWINGS

Exemplary embodiments will now be described in conjunction with the drawings in which:

FIG. 1 is a prior art circuit block diagram of a conventional circuit having a tap at an input end;

FIG. 2 is a prior art diffraction grating for splitting an incoming beam into several beams;

DETAILED DESCRIPTION

Figure 3:
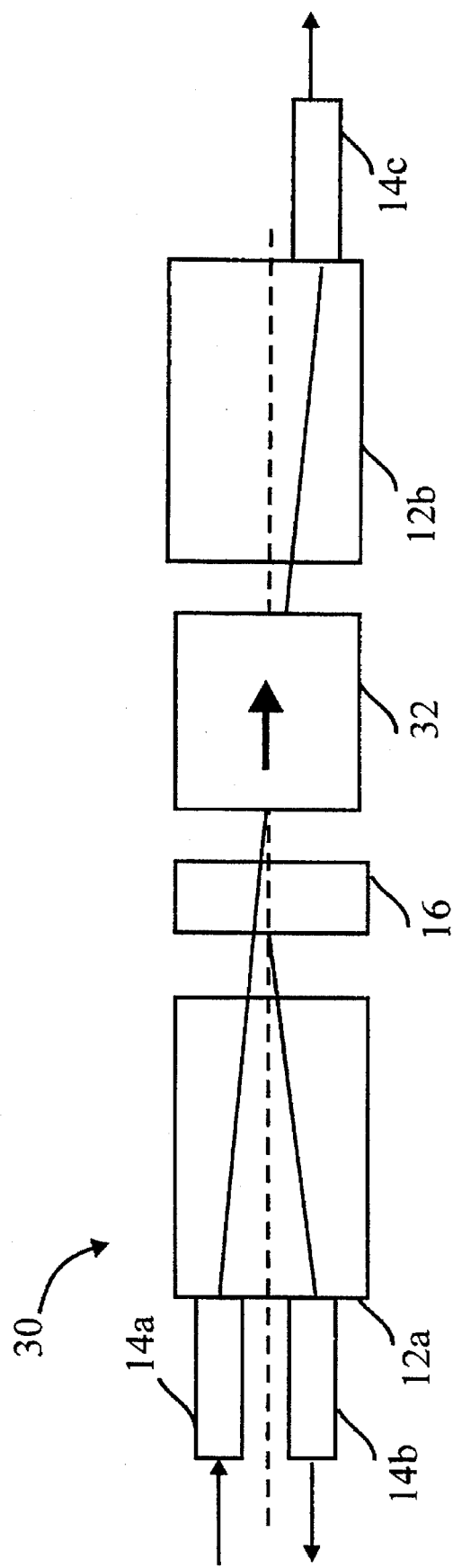
FIG. 3 is a prior art circuit having a tap port at an input end and having an optical isolator in series with a splitter filter.

Graded index (GRIN) lenses are commonly used to couple light from one optical fiber to another through an optical element. Lenses of this type are produced under the trade name "SELFOC"; the mark is registered in Japan and is owned by the Nippon Sheet and Glass Co. Ltd. When light propagating within an optical fiber is to be passed through a discrete optical element coupled to the optical fiber, the light must exit an end face of the fiber, be collimated, and the collimated beam must be directed towards the discrete optical element. In many instances, a GRIN lens capable of collimating diverging light rays exiting an optical fiber is disposed between the optical fiber and a discrete optical element. In such an instance where light is to pass from one optical fiber to another through an optical element, a pair of matched quarter pitch GRIN lenses can be placed within a gap between the two optical fiber end faces. Thus, in operation light exits a first optical fiber, is collimated by a first quarter pitch GRIN lens, passes through a discrete optical element disposed between the pair of matched quarter pitched GRIN lenses, and is focused by the second quarter pitch GRIN lens of the pair into an end of a second optical fiber.

Since GRIN lenses are commonly available to meet a variety of specifications at a relatively low cost, and since these lenses are relatively compact, their use has become nearly ubiquitous in the field of opto-electronics.

Referring now to prior art FIG. 1, first and second one quarter pitch GRIN lenses 12a and 12b are shown; an outer end face of the first lens 12a (on the left) has input and output ports coupled to optical fibers; an outer end face of the second lens 12b (on the right) has a single input port coupled to an optical fiber.

Focused light entering an end face of a 0.25 pitch GRIN lens 12a propagates through it and becomes collimated at an opposite end face of the lens. In this figure, an optical coupling is shown that includes a tap 16 disposed between the pair of matched quarter pitch GRIN lenses 12a and 12b.

Although in FIG. 1, a 0.25 pitch GRIN lens is utilized, for a greater understanding of SELFOC® lenses the following explanation is provided. A one pitch lens describes the length of a GRIN lens required for light of a particular wavelength to execute one cycle or one sine wave. For example if an object is placed on one end face of the lens, an erect one-to-one magnification image is formed on the other end face of the lens. Further, pitch P is directly proportional to the lens length (Z) as shown in the equation below:

$$Z = \frac{2\pi P}{\sqrt{A}} \quad (1)$$

where $\sqrt{A}(\lambda)$ is the index gradient constant, a coefficient that shapes the parabolic function or gradient profile of the lens.

Since the pitch of a lens is proportional to the length and its length is proportional to a predetermined wavelength of light that will be propagating though the lens, a quarter pitch collimating lens having predetermined length (Z), collimates light of a predetermined wavelength. Stated differently, for light to be collimated by a particular 0.25 pitch GRIN lens, its length (Z) must be matched (see equation (1) above.) to the wavelength of the light it is capable of collimating.

In operation, the arrangement of optical elements, serves to tap a predetermined portion of the input light into a single optical fiber and to pass a remaining portion of the input light. A beam of light is launched into an input port 14a of the first lens 12a and a portion is reflected back by the filter 16 to the output port on the same end face of the first lens 12a. The remaining portion of the input beam propagates through the filter 16 and is transmitted through second GRIN lens 12b (on the right), propagates and is focused at the output port 14c of the second GRIN lens 12b. Although this device in some instances provides its intended function of providing a tap, it becomes increasingly limited in its application if other optical elements are included in the circuit. For example in FIG. 3 an optical device is shown having the same elements of FIG. 1 including an isolator 32 disposed between the splitter filter 16 and the second output GRIN lens 12b. One of the limitations of this device is that the tapped signal is extracted prior to the input optical signal propagating through the optical isolator 32 and thus does not provide accurate information relating to the output signal after having passed through the isolator. It would therefore be preferable to provide a tap at the output end of the device rather than at the input end. Attempting to utilize a splitter filter 16 between the isolator 32 and the output lens 12b is not practicable. In such an embodiment, a considerable amount of space is required between the output lens and the isolator 32 to extract a tap signal from the device substantially increasing the overall length of the device.

Referring now to FIG. 2, a grating is shown in the form of a holographic beam sampler (HBS) 25 for splitting a single beam optical input signal into two beams propagating in forward divergent directions. HBSs are commercially available devices manufactured by GENTEC Electrooptics of Ste. Foy Quebec. The HBS is a diffraction grating that is capable of producing three useful pairs of transmitted orders symmetrically disposed with respect to a main beam; wherein second and third order samples are respectively the square and the cube of the first order.

Figure 4:
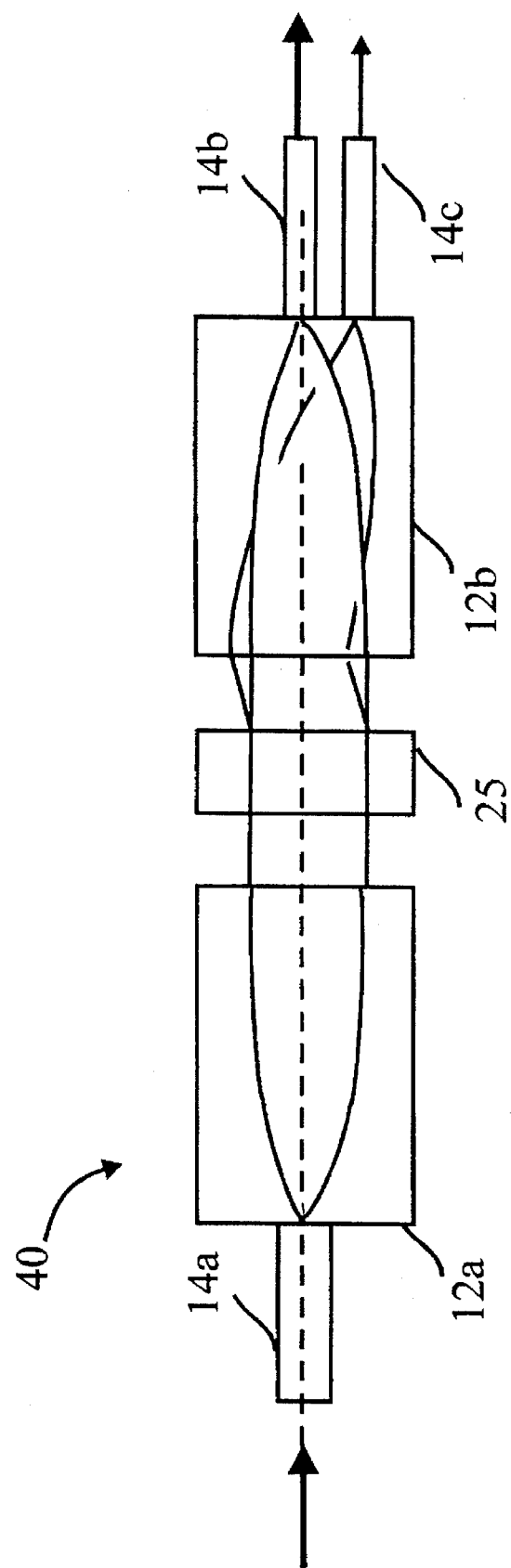
FIG. 4 is an optical splitter/coupler in accordance with the invention, having a tap port at an output end.

An embodiment of a device in accordance with this invention used as a basic building block to achieve several other embodiments described hereafter, is shown in FIG. 4. A pair of GRIN lenses 12a and 12b are shown having their collimating ends back to back. Disposed between the GRIN lenses 12a and 12b is a HBS positioned to receive light from the lens 12a and to transmit light to GRIN lens 12b in a first tapping mode of operation. Light launched into port 14a at the focusing end of GRIN lens 12a is collimated by lens 12a and propagates into the HBS 25 where it is split in a predetermined ratio dependent upon the desired characteristics of the HBS 25 into two beams, a first of which propagates in its original forward direction with no change in angle, and a second of which propagates at an angle to the first beam in a forward direction. Due to the properties of the GRIN lens, light along the optical axis is focused at a point on the axis at port 14b at an end face of lens 12b. The second beam off-angle from the optical axis of lens 12b is focused at port 14c offset from the optical axis. Thus an input beam at 14a is directed to the ports 14b and 14c at lens 12b in a predetermined ratio providing a tap beam and a main beam. In a second coupling mode of operation, light that is launched into the two ports 14b and 14c enters the HBS 25 at two different angles and is combined into a single beam focused at port 14a. Essentially, the tapping device described heretofore with reference to FIG. 4 may be used in a backwards direction as a coupler.

Figure 4A:
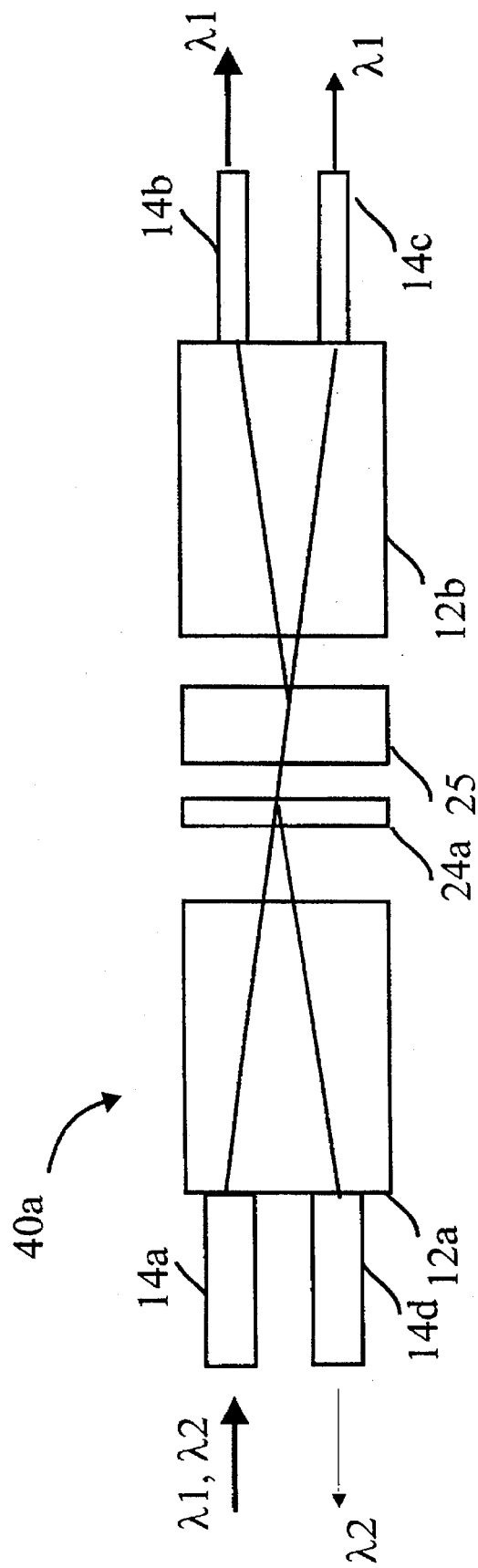
FIG. 4a is an optical splitter/coupler similar to the one shown in FIG. 4 and having a WDM filter near the input port for porting back light of a predetermined frequency.

Referring now to FIG. 4a, an embodiment similar to that of FIG. 4 is shown, however, having 4 ports. In this embodiment a WDM filter 24a designed to pass light of wavelength λ1 and to reflect light of wavelength λ2 is disposed between the input GRIN lens 12a and the HBS 25. Thus when light comprising wavelengths λ1 and λ2 is launched into port 14a, light of wavelength λ2 is reflected back to port 14d while light of wavelength λ1 is passed to the HBS 25. Similarly, as with the previous embodiment, light irrespective of wavelength launched into the HBS 25 is split into two beams directed at different forward locations and as a consequence of being launched into the GRIN lens 12b, the two beams are ported to different ports 14b and 14c at the output of lens 12b.

Figure 4B:
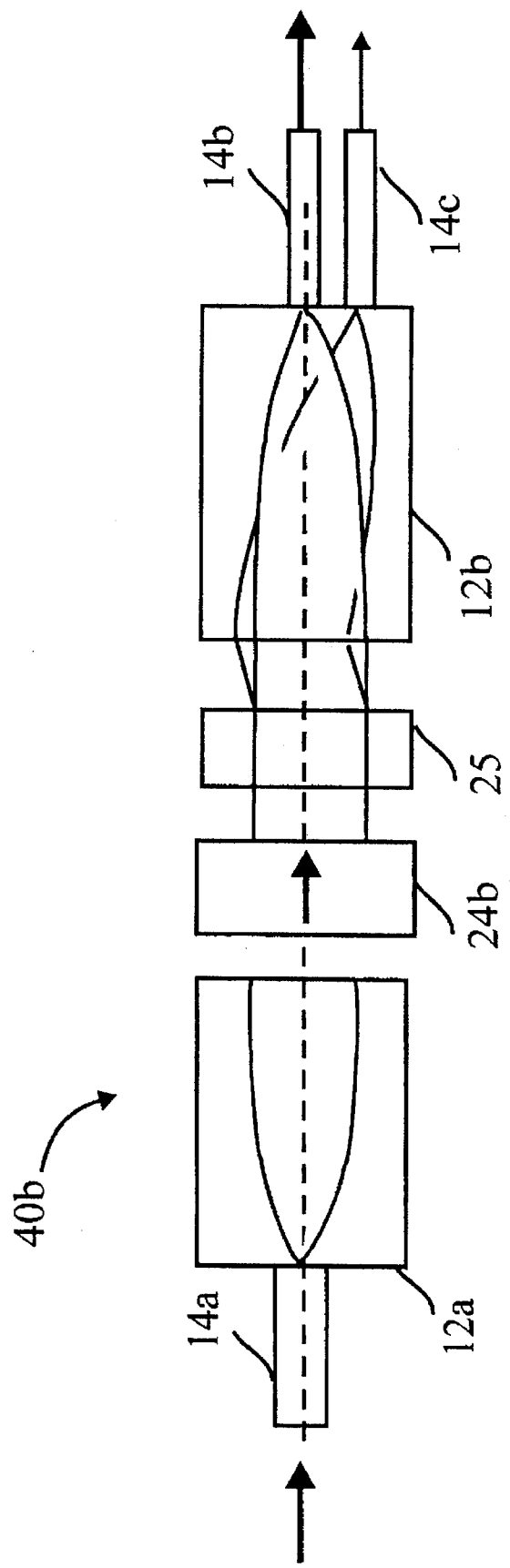
FIG. 4b is an optical splitter/coupler similar to the one shown in FIG. 4 and having an isolator adjacent an input port.

FIG. 4b is again similar to that of FIG. 4, however, advantageously provides a means of tapping an isolated signal at the output end of the device. In FIG. 4b an optical isolator 24b is disposed between the input GRIN lens 12a and the HBS 25.

Figure 5:
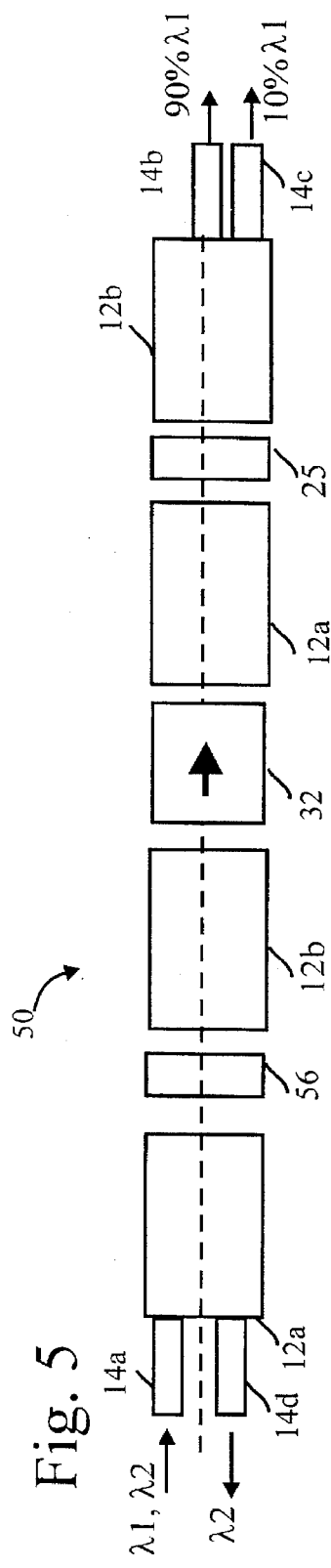
FIG. 5 is an alternative embodiment of a splitter including a WDM and an isolator.

Turning now to FIG. 5, an embodiment of the invention is shown wherein two back to back input/output GRIN lenses 12a and 12b are disposed along a common optical axis and have a wavelength division multiplex/demultiplexing (WDM) filter 56 therebetween; adjacent the focusing lens 12b is an isolator 32 optically coupled to and in-series with the collimating GRIN lens 12a. A HBS 25 is disposed between back to back input/output lenses 12a and 12b which are in series with the isolator 32. Advantageously, this arrangement of optical components allows light to be tapped from the output port after it has passed through the optical isolator 32. In operation light comprising wavelengths λ1 and λ2 is launched into input port 14a; The WDM filter 56 is designed to pass light of wavelength λ1 and reflect light of wavelength λ2 to port 14d. Thus wavelength M is passed through the lens 12b the isolator 32 and the HBS 25 where conveniently the light is split into two beams in a predetermined ratio wherein 90% of the light is routed to port 14b and 10% of the light is routed to port 14c.

Figure 6:
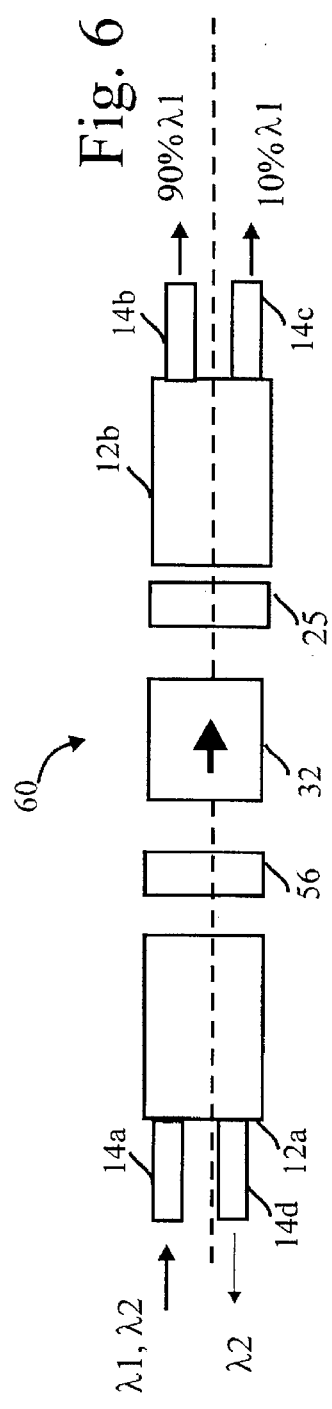
FIG. 6 is an alternative embodiment of a splitter including a WDM and an isolator in accordance with the invention wherein the light propagating through the optical elements is collimated; and, FIG. 7 is an alternative embodiment of the invention similar to FIG. 6 and including an optical amplifier, the tap beam being at the output end and comprising a portion of the amplified signal.

A similar embodiment to FIG. 5 is shown in FIG. 6, however the beam passing through elements 56, 32, and 25 is collimated rather than being refocused prior to being launched into the isolator 32.

Figure 7:
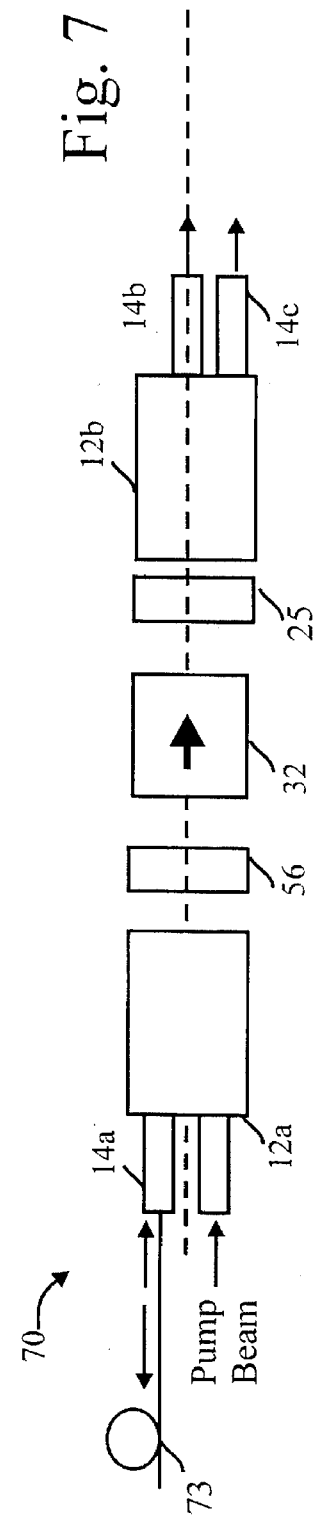

Turning now to FIG. 7, an amplifying circuit is shown having an amplifier 73 backwards pumped by a pump beam launched into port 14d of lens 12a. The pump beam of wavelength λ2 is reflected backwards by WDM 56 into port 14a and into an erbium doped amplifier EDFA 73. A signal of wavelength λ1 launched into the EDFA 73 in a forward direction is amplified and passes through the WDM filter 56, isolator 32, HBS 25 and is focused at the two ports 14b and 14c. The invention in accordance with this embodiment amplifies, isolates and passes the amplified isolated signal to a main output port and a tap port 14b and 14c respectively.

Of course numerous other embodiments of this invention may be envisaged, without departing from the spirit and scope of this invention.

I claim:

1. An optical device having a tap port for tapping a portion of input light, comprising:

a first substantially collimating graded index lens having at least an input port for inputting the light;

means for splitting the light independent of its polarization state and substantially independent of its wavelength into at least a first and second beam of light, the two substantially non-parallel beams propagating in a same forward direction;

a second substantially focusing graded index lens having at least two ports at a focusing end to receive the at least first and second beams of light, the means for splitting the light being disposed between the first and second graded index lenses; and, two optical fibres having ends adjacent the at least two ports for receiving the first and second beams of light, the two optical fibre ends having substantially parallel longitudinal axes and being substantially coaxial with the longitudinal axis of the second graded index lens.

2. A device as defined in claim 1, further comprising additional optical elements disposed between one of the lenses and the means for splitting light.

3. A device as defined in claim 1, wherein the means for splitting light comprises a holographic beam sampler.

4. A device as defined in claim 1, wherein the additional optical elements comprise at least one of an optical filter and an optical isolator.

5. An optical device as defined in claim 1, wherein the device comprises an optical amplifier.

6. An optical device for routing light, comprising:

a first substantially collimating/focusing graded index lens having at least port for passing the light;

means for splitting the light independent of its polarization state and substantially independent of its wavelength into at least a first and second beam of light, the two substantially non-parallel beams propagating in a same forward direction, or combining the light independent of its polarization state from at least a first and second beam of light into a single beam of light;

a second substantially collimating/focusing graded index lens having at least two ports to receive the at least first and second beams of light, the means for splitting or combining the light being disposed between the first and second graded index lenses; and, two optical fibres having ends adjacent the at least two ports for receiving the first and second beams of light, the two optical fibre ends having substantially parallel longitudinal axes and being substantially coaxial with the longitudinal axis of the second graded index lens.

7. An optical device for routing light and for providing amplification comprising:

a rare earth doped waveguide for providing an amplified signal;

means for pumping the rare earth doped waveguide coupled to the waveguide;

an input graded index lens optically coupled to the rare earth doped waveguide for receiving at least most of the amplified signal;

an output graded index lens optically coupled to the first lens; and, a means disposed between the first and output graded index lenses for splitting the light independent of its polarization state and substantially independent of its wavelength into at least a first and second beam of light, the two substantially non-parallel beams propagating in a same forward direction; and, two optical fibres having ends adjacent the output graded index lens for receiving the first and second beams of light, the two optical fibre ends having substantially parallel longitudinal axes and being substantially coaxial with the longitudinal axis of the output graded index lens.

* * * * *